United States Patent [19]

Arimoto

[11] Patent Number: 4,860,118
[45] Date of Patent: Aug. 22, 1989

[54] IMAGE SIGNAL PROCESSING APPARATUS WITH EDGE EMPHASIS AND VARIABLE MAGNIFICATION

[75] Inventor: Shinobu Arimoto, Tokyo, Japan

[73] Assignee: Canon Kabushiki Kaisha, Tokyo, Japan

[21] Appl. No.: 159,305

[22] Filed: Feb. 22, 1988

[30] Foreign Application Priority Data

Feb. 25, 1987 [JP] Japan .................................. 62-43501
Feb. 25, 1987 [JP] Japan .................................. 62-43509

[51] Int. Cl.⁴ ........................ H04N 1/393; H04N 1/40
[52] U.S. Cl. .................................... 358/451; 358/447
[58] Field of Search ........................ 358/256, 284, 287

[56] References Cited

U.S. PATENT DOCUMENTS 4,589,034 5/1986 Yokomizo ............................ 358/284
4,672,463 6/1987 Tomohisa et al. .................. 358/284
4,748,677 5/1988 Yokomizo ............................ 358/284

FOREIGN PATENT DOCUMENTS 60-114082 6/1985 Japan .................................. 358/287

Primary Examiner—James J. Groody
Assistant Examiner—Randall S. Svihla
Attorney, Agent, or Firm—Fitzpatrick, Cella, Harper & Scinto

[57] ABSTRACT

An image signal processing apparatus may include a line sensor for photoelectrically reading an original image and outputting an image signal, a rotary encoder for setting reproduction magnifications of the original image, an edge emphasis circuit for performing edge emphasis processing for the image signal output from the line sensor, and W- and R-address counters and first and second clock cotnrol signals, all of which cooperate to control a degree of edge emphasis performed by the edge emphasis circuit in accordance with the reproduction magnification set by the rotary encoder. The magnification can preferably be set independently for the main scanning and the sub-scanning directions. A correction signal is used in the edge emphasis processing, and is preferably formed on the basis of image signals of pixels near the particular pixel of interest. The image signal may also be smoothed after edge emphasis.

34 Claims, 8 Drawing Sheets

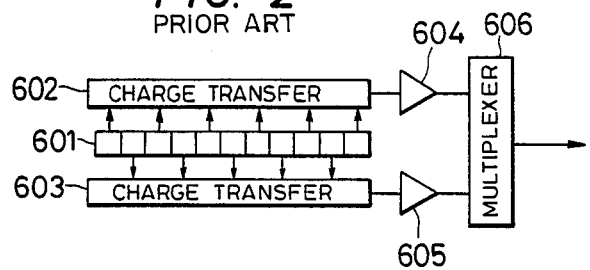
FIG. 2
PRIOR ART
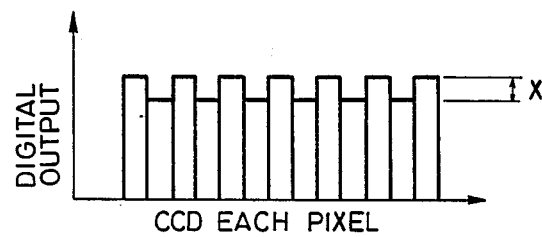
FIG. 3A
PRIOR ART
FIG. 3B
PRIOR ART
FIG. 3C
PRIOR ART
FIG. 3D
PRIOR ART

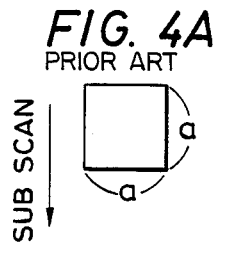
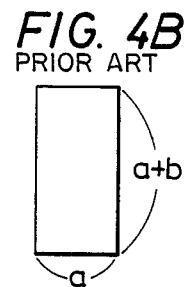
FIG. 4A PRIOR ART
FIG. 4B PRIOR ART
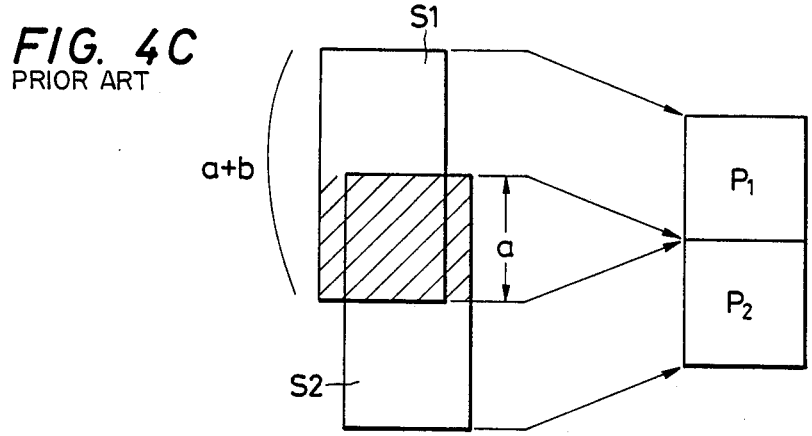
FIG. 4C PRIOR ART
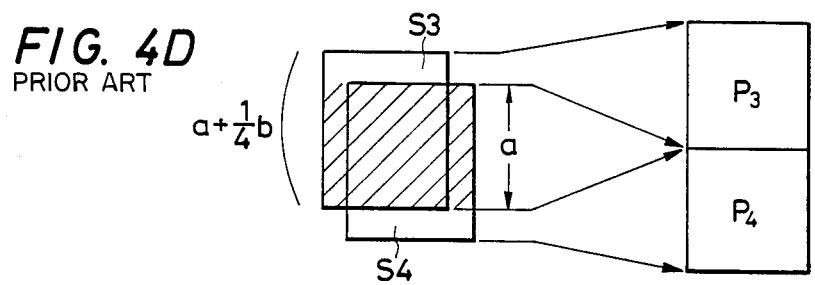
FIG. 4D PRIOR ART
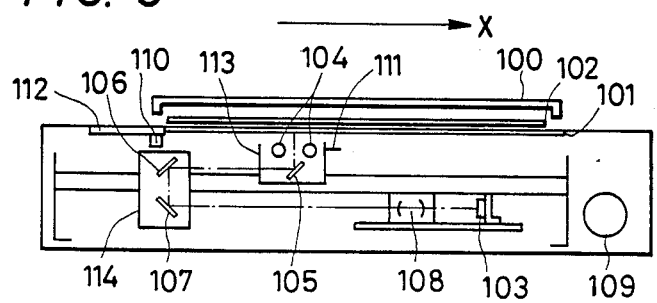
FIG. 5

IMAGE SIGNAL PROCESSING APPARATUS WITH EDGE EMPHASIS AND VARIABLE MAGNIFICATION

BACKGROUND OF THE INVENTION

1. Field of the Invention

The present invention relates to an image signal processing apparatus for causing an image sensor such as a CCD to read an original image to obtain an image signal and processing the image signal.

2. Related Background Art

A conventional digital copying machine includes a known laser beam printer as an image recording output unit which utilizes an electrophotographic technique and a scanner as an image reading unit which causes a line sensor such as a CCD to photoelectrically read an image in a main scanning direction. Reading of the image along the sub-scanning direction in the scanner is performed by mechanically moving an original relative to the photoelectric transducer element in a direction perpendicular to the read direction of the element.

When an image output operation with a variable magnification is performed in the arrangement described, it is very difficult to stably change a scanning speed of main laser scanning in the axial direction of a photosensitive body in a laser beam printer and a scanning speed of rotation of a sub-scanning drum in a direction perpendicular to the axial direction of the photosensitive body. Therefore, variable magnification operations are performed on only the scanner side.

The original scanning speed of the scanner is increased relative to the rotational speed of the drum to reduce the image and is decreased relative thereto to enlarge the image. An image enlargement in the main scanning direction is performed by thinning a one-line image signal in the main scanning direction every predetermined number of pixels. An image reduction is performed by overlapping the one-line image signal every predetermined number of pixels.

In addition, edge emphasis is performed to emphasize an edge of a read image to obtain a sharp image. As a typical example of edge emphasis, a quadratic differential is performed by a Laplacian filter in both the sub-scanning and main scanning directions, and a pixel of interest is corrected on the basis of the quadratic differential.

FIG. 1 is an arrangement of a conventional edge emphasis circuit. A one-line digital image signal 801 is stored in each of line memories 820, 821, and 822 of a three-line delay buffer memory 802. A three-line image signal consisting of a current line image signal 803, an immediately preceding line image signal 804, and an image signal 805 of a line which is two lines ahead of the current line are output from the buffer memory 802. These image signals are delayed by a latch 806 in units of pixels.

The pixel of interest is a signal 807 obtained by delaying the immediately preceding image signal 804 by two pixels. An adder 811 adds a result obtained by doubling the signal 807 of the pixel of interest and results obtained by multiplying adjacent pixel signals 808 and 809 of the main scanning direction with −1. Therefore, a quadratic differential signal 812 for the pixel of interest in the main scanning direction is obtained.

An adder 815 adds results obtained by multiplying pixel signals 813 and 814 of lines adjacent to the line including the pixel of interest by −1 and a result obtained by doubling the signal 807 of the pixel of interest. Therefore, a quadratic differential signal 817 for the pixel of interest in the sub-scanning direction is obtained.

These quadratic signals 812 and 817 are added to the signal 807 of the pixel of interest by an adder 818 to obtain an edge-emphasized image signal 819.

An output image is adversely affected by the above-mentioned variable magnification techniques and edge emphasis processing in various ways.

First, even if an original having a uniform density is read, an amplitude of the resultant image signal is not uniform partially due to an internal arrangement of a CCD line sensor, as shown in FIG. 2.

Even- and odd-numbered pixel outputs from light-receiving cells 601 are alternately transferred to separate charge transfer units 602 and 603 and are output as a one-line image signal at a multiplexer 606 through corresponding amplifiers 604 and 605.

Variations of digital image signals from the pixels depend on variations in sensitivity of the light-receiving cells, DC offset variations caused by different charge transfer units, and nonlinear gains for small signals in the amplifiers.

In order to correct the above variations, various correction techniques such as DC drift elimination and shading correction have been proposed. However, these conventional techniques are based on an assumption that a CCD line sensor output is proportional to an amount of light received by the CCD line sensor. Therefore, the above correction cannot be performed with high precision due to nonlinearity of the light-receiving element with respect to a very small amount of input light and nonlinearity of the amplifier.

This correction error is primarily included in black information and is caused by variations in units of pixels as shown in FIG. 3A. The variations in the main scanning direction are emphasized by the edge emphasis circuit (FIG. 1), as shown in FIG. 3B (compare the magnitude of original difference X with the difference Y which results after edge emphasis).

The above variations are further emphasized by image thinning for image reduction, as shown in FIG. 3C. A portion such as the C-1 portion obtained by thinning a portion having a high density consists of successive bright pixels and is emphasized as a sharp white line in a copy output. A portion such as the C-2 portion obtained by thinning a portion having a low density consists of successive dark pixels and is emphasized as a sharp black line in a copy output.

In addition, when an image is enlarged, edge-emphasized image information is increased along the main scanning direction, as shown in FIG. 3D. Variations in density are emphasized by a degree corresponding to an increased output area per pixel.

As is apparent from the above description, CCD variations emphasized by edge emphasis in the conventional apparatus are further emphasized by variable magnification processing along the main scanning direction, resulting in inconvenience.

Mismatching between variable magnification processing and edge emphasis processing in the sub-scanning direction also results in inconvenience.

As shown in FIG. 4A, one pixel of a CCD line sensor has a predetermined length in both the main scanning and the sub-scanning directions. The predetermined length is represented by length a. When a CCD line sensor with the opening length a is shifted by a distance b with respect to the original in the sub-scanning direction and one pixel is scanned and read, an area of a ×(a+b) is read as one pixel, as shown in FIG. 4B.

Assume that the read distance b in the sub-scanning direction is defined as a scanning length in a one-to-one reading. As shown in FIG. 4C, an image read with a scanning line in an original area S1 is recorded as a pixel P1 in the printer. An image read with the same pixel on the next line in an original area S2 is recorded as a pixel P2 in the printer. The pixels P1 and P2 include a common blurring portion (indicated by hatched lines) corresponding to the opening area of the CCD line sensor.

A ratio of blurring per pixel of the recorded image is given as a/(a+b).

As shown in FIG. 4D, where original areas S3 and S4 are recorded respectively as pixels $P_3$ and $P_4$, if an original read displacement per pixel in the sub-scanning direction is given as b/4 and a recording magnification in the sub-scanning direction is given as 400%, the ratio of blurring per pixel of the recorded image is given as a/(a+b/4). In this manner, when an enlargement coefficient is increased, the sub-scanning length is reduced. A decrease in the value of the denominator of the blurring ratio expression causes an increase in blurring.

In a conventional apparatus, when sub-scanning edge emphasis having a fixed magnitude is used to increase the enlargement coefficient, the amount of blurring included in the image is undesirably increased.

SUMMARY OF THE INVENTION

The present invention has been made in consideration of the above situation, and has as its object to provide an image processing apparatus capable of performing good variable magnification processing for an image signal representative of an original image.

It is another object of the present invention to provide an image signal processing apparatus capable of performing good edge emphasis processing for an image signal.

It is still another object of the present invention to provide an image signal processing apparatus capable of eliminating drawbacks which occur as a result of a combination of variable magnification processing and edge emphasis processing.

It is still another object of the present invention to provide an image signal processing apparatus capable of performing various types of processing suitable for a reproduction magnification of an image.

The above and other objects, features, and advantages of the present invention will be apparent from the following detailed description of the preferred embodiment of the invention taken in conjunction with the accompanying drawings.

BRIEF DESCRIPTION OF THE DRAWINGS

FIG. 2 is a view showing an arrangement of an image read line sensor;

FIGS. 3A to 3D are views showing variations in main scanning pixels due to edge emphasis and variable magnification;

FIGS. 4A to 4D are views showing scanning blurring in the sub-scanning direction;

FIG. 5 is a sectional view of an image reading apparatus;

DETAILED DESCRIPTION OF THE PREFERRED EMBODIMENT

Figure 1:
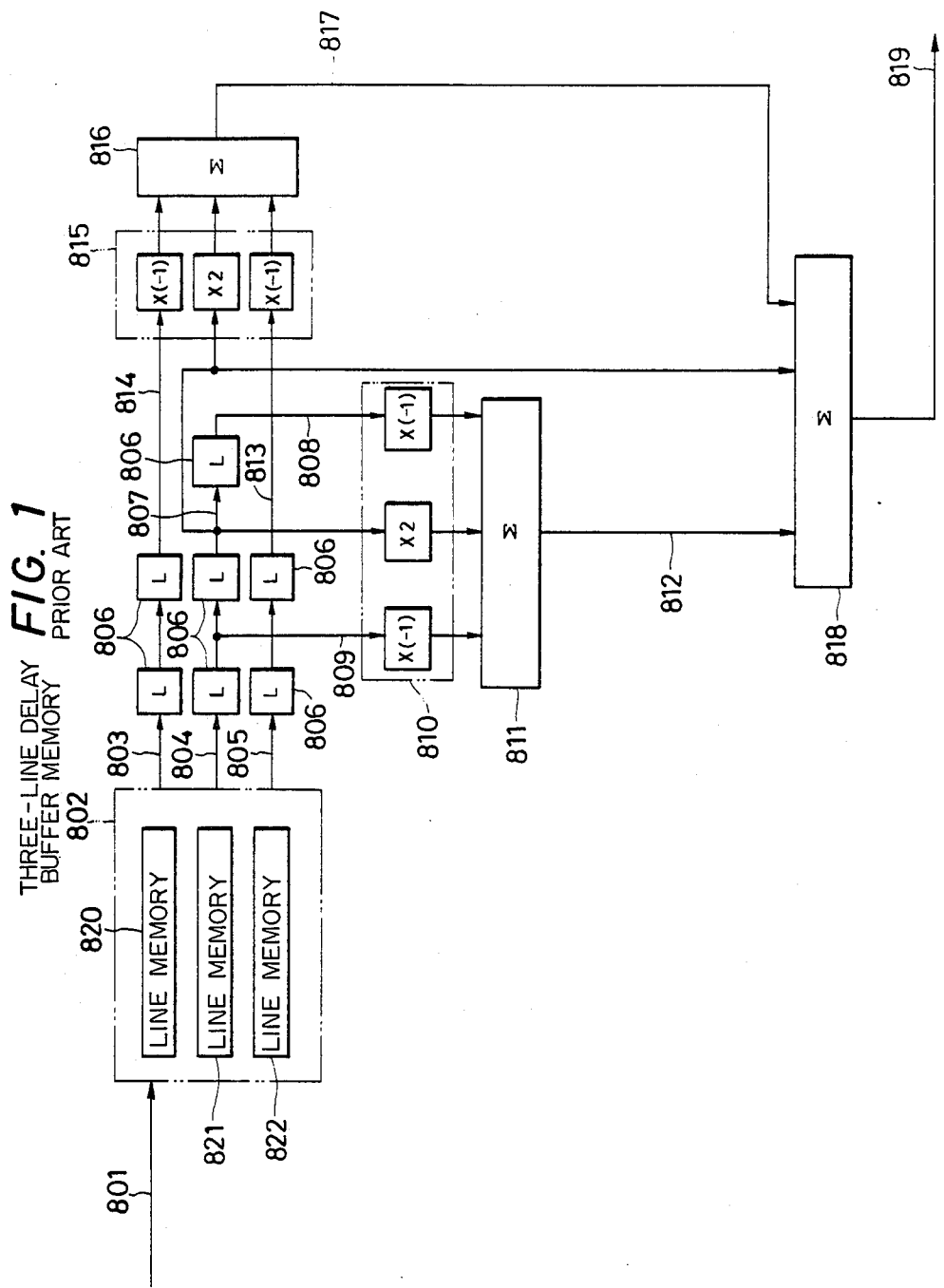
FIG. 1 is a view showing a conventional edge emphasis circuit.

The present invention will be described in detail with reference to the preferred embodiment.

FIG. 5 shows an arrangement of an original reading apparatus (to be referred to as a scanner hereinafter) employing the present invention. A CCD line sensor 103 comprising a plurality of light-receiving elements arranged on one line is used to read image information of an original 102 placed on an original glass table 101 and covered with an original cover 100. Light emitted from a light source 104 is reflected by the surface of the original and is focused on the CCD line sensor 103 by a lens 108 via mirrors 105, 106, and 107.

An optical unit 113 comprising a light source 104 and the mirror 105, and an optical unit 114 comprising the mirrors 106 and 107 are moved relative to each other at a ratio of 2:1. These optical units 113 and 114 are moved by a DC servo motor 109 under PLL (Phase-Locked Loop) control at a constant speed from the left to the right. The speed in the forward path is variable according to magnification. In the one-to-one read mode, the speed is 180 mm/sec. In an 800% enlargement mode, the speed is 22.5 mm/sec. In a 50% reduction mode, the speed is 360 mm/sec. The optical unit is moved from the home position as the left end to a predetermined position while the image is read by the CCD line sensor 103 at a resolution of 400 dots/inch in a main scanning direction (to be referred to as a Y direction hereinafter) perpendicular to a sub-scanning direction (to be referred to as an X direction hereinafter) along which the optical unit is driven. The CCD line sensor 103 is then moved from the predetermined position to the home position, thereby completing one scanning cycle. The home position is detected such that a light-shielding plate 111 crosses a home position sensor 110 comprising a photointerrupter. A reference density plate 112 is used for shading correction and intensity control of the light source 104. A position at which the home position sensor 110 detects the light-shielding plate 111 is a position where the reference density plate 112 can be read by the CCD line sensor 103.

Figure 6:
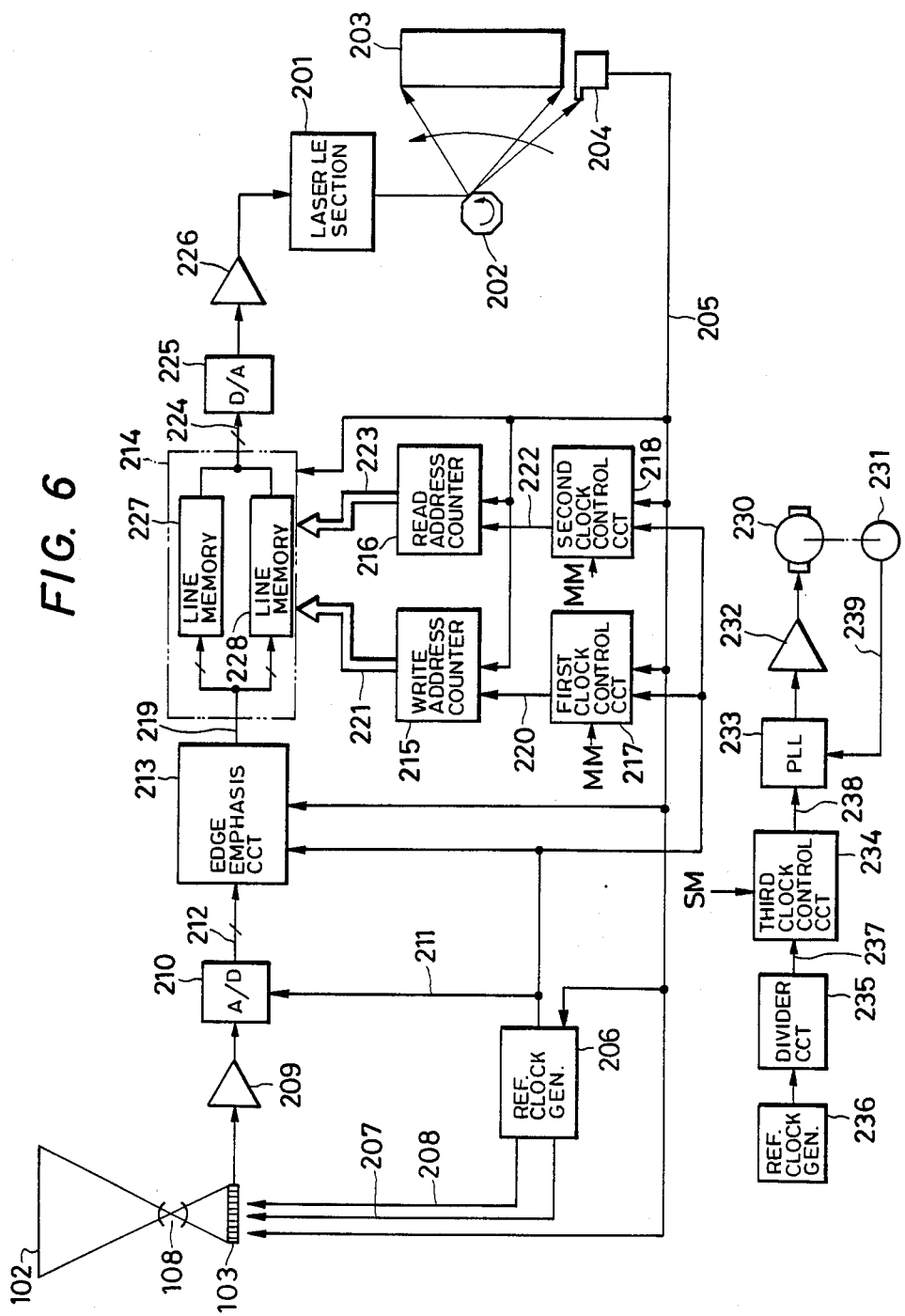
FIG. 6 is a block diagram of an image processing circuit.

FIG. 6 is a block diagram of signal processing from image reading to image recording. The signal processing circuit in FIG. 6 includes a laser LE section 201. A laser beam emitted from the laser LE section 201 is scanned by a polygonal scanner 202 on the surface of a drum 203. The polygonal scanner 202 is rotated at a constant high speed and the drum 203 is rotated at a constant speed. In this case, the laser beam is detected by a photodiode 204 arranged near the drum on a line extending from the scanning line, and a main scanning sync signal 205 is generated.

A one-line image signal read out from the CCD line sensor 103 in response to two-phase clocks 207 and 208 generated (in synchronism with the sync signal 205) by a reference clock generator 206 is amplified by an amplifier 209. The amplified signal is converted by an A/D converter 210 into an 8-bit digital image bit signal 212 synchronized with a pixel clock 211. The digital image signal 212 is input to an edge emphasis circuit 213.

The edge emphasis circuit 213 comprises a 3-line delay buffer serving as a Laplacian filter and takes a quadratic differential in the main scanning and sub-scanning directions independently, thereby emphasizing an edge of an image.

An image signal edge-emphasized by the edge emphasis circuit 213 is temporarily written in line memories 227 and 228 in a double buffer memory 214 in units of lines and is read out again to perform variable magnification processing in the main scanning direction.

A write address counter (to be referred to as a W-address counter hereinafter) 215 and a read address counter (to be referred to as an R-address counter) 216 are operated in synchronism with the main scanning sync signal 205. The W- and R-address counters 215 and 216 are operated for variable magnification processing.

Variable magnification processing is performed by changing an operation speed ratio of the W- and R-address counters 215 and 216. In order to change the operation speeds of the counters, first and second clock control circuits 217 and 218 are used.

The first clock control circuit 217 for the W-address counter 215 comprises two cascade-connected TTLs such as ICs 74167. The first clock control circuit 217 controls the number of passed clocks among 100 clocks in accordance with a magnification signal MM output from a rotary encoder SW for setting a main scanning magnification (to be described later).

The second clock control circuit 218 for the R-address counter 216 comprises two cascade-connected TTLs such as ICs 7497. The second clock control circuit 218 controls the number of passed clocks among 4096 clocks in accordance with the magnification signal MM as in the first clock control circuit 217.

Operations for performing 50% image reduction and 200% image enlargement will be described below.

Figure 7:
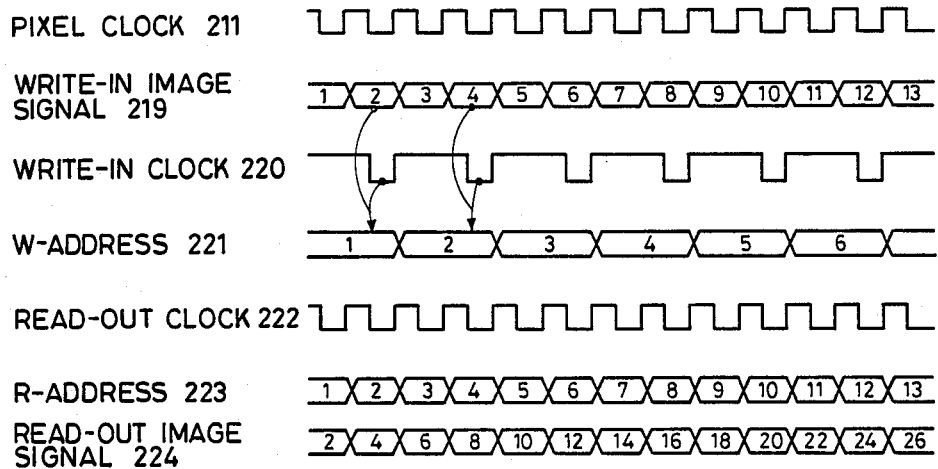
FIG. 7 is a timing chart for explaining main scanning reduction processing.

In order to perform 50% image reduction, as shown in FIG. 7, every other pixel clock 211 is thinned by the first clock control circuit 217 to form a write-in clock 220. A W-address 221 generated by the W-address counter 216 in response to the write-in clock 220 is updated every two edge-emphasized write image pixels. Only even-numbered pixels of a write-in image signal 219 are written in the memory 214. The image signal written in the memory 214 is output without thinning the pixel clocks 211 by the second clock control circuit 218, to prepare a read-out clock 222. An image signal is read out by an R-address 223 generated by the R-address counter 216 in response to the read-out clock 222. The image signal read out from the memory 214 is a signal obtained by reducing an image of the write-in image signal 219 by 50% in the main scanning direction.

As described above, a reduction coefficient M (%) is determined by the number P of clocks (among 100 clocks) passing through the first clock control circuit 217:

$$M(\%)/100 = P/100$$

In other words, the same value as the reduction coefficient M (%) is set as the number P of clocks passing through the control circuit 217.

Figure 8:
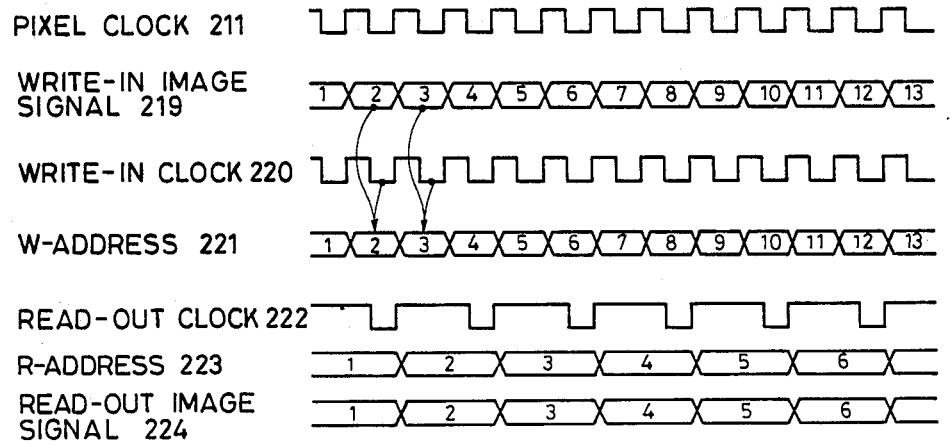
FIG. 8 is a timing chart for explaining main scanning enlargement processing.

In 200% enlargement, in order to write the write-in image signal in the memory 214 without processing, the pixel clocks 211 are not thinned by the first clock control circuit 217 and are directly supplied to the W-address counter 215, as shown in FIG. 8.

In order to read out the image signal written in the memory 214, every other clock 211 is transmitted through the second clock circuit 218, to prepare a read-out clock 222. The image signal 224 read out (in response to the read-in clock 222) by the R-address 223 generated by the R-address counter 216 is processed such that the period of one pixel is twice that of the write-in image signal 219. 200% enlargement in the main scanning direction is thus performed.

As described above, the enlargement coefficient M (%) is determined by the number Q of clocks (among 4096 clocks) passing through the second clock control circuit 218:

$$M(\%)/100 = 4096/Q$$

The image signal variably magnified in the main scanning direction is converted into an analog signal by a D/A converter 225. The analog signal is then amplified by an amplifier 226, and the laser intensity per pixel is controlled by a laser driver 201. The amount of charge on the drum 203 is then controlled by the intensity-controlled laser beam, and a one-line latent image corresponding to this image signal is formed on the drum 203. The latent image is changed into a density-modulated toner image in units of pixels in accordance with an electrophotographic process (not shown).

A DC servo motor 230 generates a driving force for reciprocally driving the optical units. An encoder 231 generates a clock signal 239 synchronized with rotation of the motor 230.

A reference clock generator 236 generates reference clocks for rotation control. The reference clocks from the reference clock generator 236 are frequency-divided by a divider circuit 235 into a clock signal 237 having a predetermined frequency. The number of clocks passing through the control circuit is controlled by a third clock control circuit 234 in accordance with a magnification signal SM from the rotary encoder SW.

A clock signal 238 from the third clock control circuit 234 is input to a PLL control circuit 233. The PLL control circuit 233 outputs a drive signal to the driver 232 so that the clock signal 238 is synchronized with a clock signal 239, thereby controlling rotation of the motor 230 and reciprocally moving the optical units at a speed corresponding to the magnification.

Figure 9:
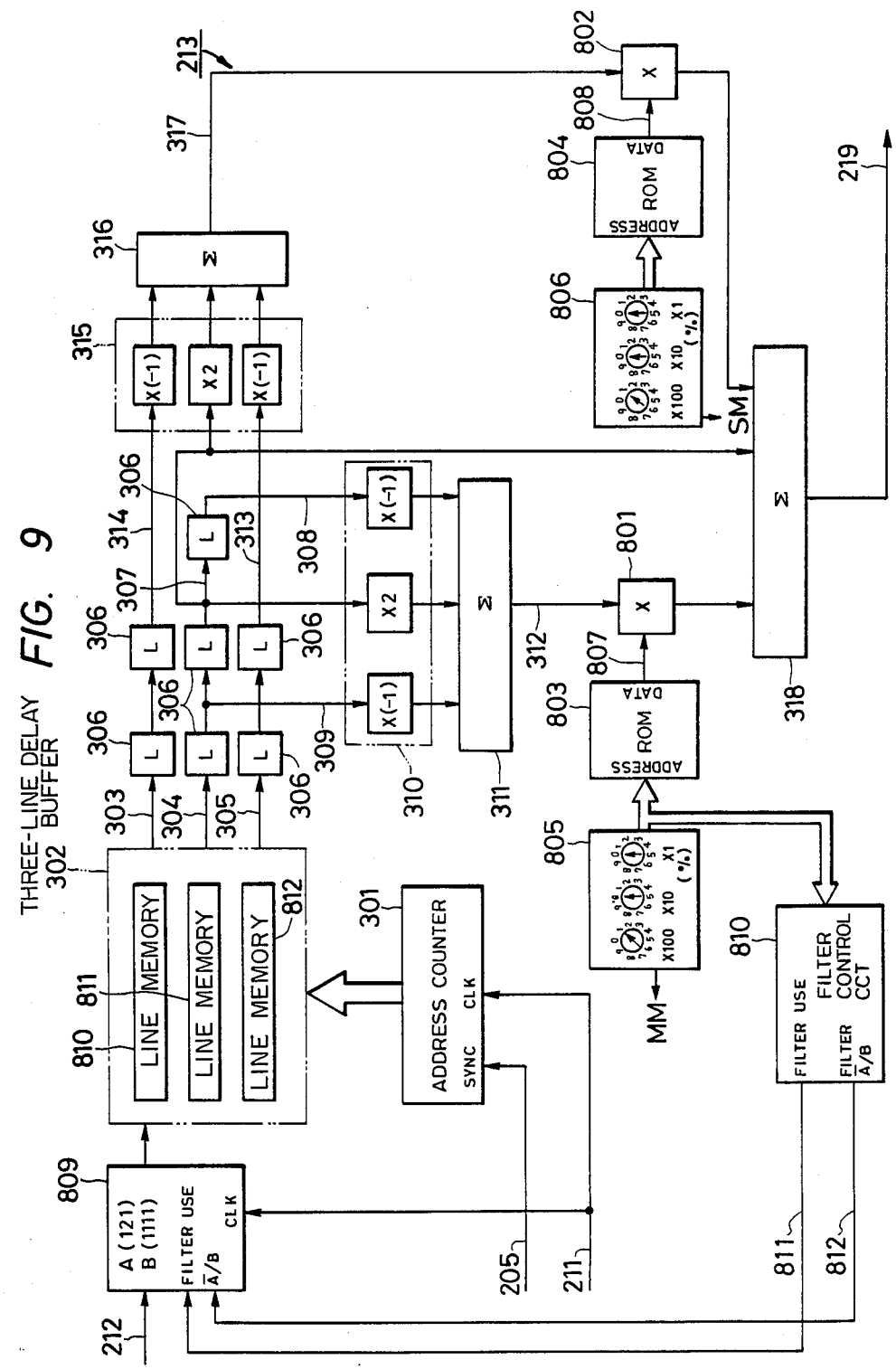
FIG. 9 is a diagram showing an edge emphasis circuit.

FIG. 9 shows a detailed arrangement of an edge emphasis circuit shown in FIG. 6.

An image signal input from the A/D converter (210 in FIG. 2) is delayed by a delay buffer 302 having three-line line memories 810 to 812 through a filter circuit 809 to be described later.

Three line image signals consisting of a current line image signal 303, an immediately preceding line image signal 304, and an image signal 305 of a line which is two lines ahead of the current line are output by the three-line delay buffer memory 302 addressed in response to an output from the address counter 301 for discriminating one-line pixels. These image signals are delayed by a latch 306 in units of pixels.

The pixel of interest is a pixel signal 307 obtained by delaying the image signal 304 of the immediately preceding line by two pixels. A multiplier 310 doubles the signal 307 of the pixel of interest. The multiplier 310 also multiplies by −1 pixel signals 308 and 309 adjacent to the signal of the pixel of interest in the main scanning direction. These three outputs from the multiplier 307 are added by an adder 311 to obtain a quadratic differential signal 312 for the pixel of interest in the main scanning direction.

Pixel signals 313 and 314 of main scanning lines adjacent to that of the pixel of interest are multiplied −1 by a multiplier 315. The multiplier 315 also doubles the signal 307 of the pixel of interest. These three products are added by an adder 316, thereby obtaining a quadratic differential signal 317 for the pixel of interest in the sub-scanning direction.

A multiplier 801 is used to increase or decrease a magnitude of a main scanning edge emphasis signal 312. A ROM 803 receives as its address signal an output from a rotary encoder 805 for setting a main scanning magnification in percentage and outputs a corresponding main scanning edge emphasis signal multiplication coefficient 807. A multiplier 802 is used to increase or decrease a magnitude of a sub-scanning edge emphasis signal 317. A ROM 804 receives as its address signal an output from a rotary encoder 806 for setting a sub-scanning magnification in percentage and outputs a corresponding sub-scanning edge emphasis signal multiplication coefficient 808.

Figure 10:
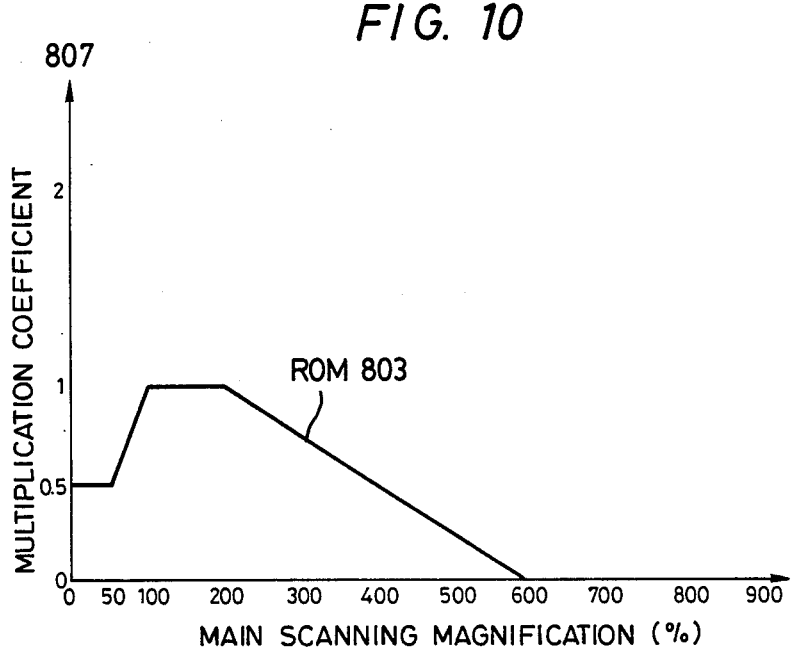
FIG. 10 is a graph showing the multiplication coefficient as a function of main scanning magnification.

The coefficient ROM 803 is arranged to prevent white or black stripes generated by reduction in the main scanning direction and to prevent areal overemphasis of pixel density variations due to enlargement, as shown in FIG. 10.

Referring to FIG. 10, the main scanning magnifications (%) set by the rotary encoder 805 are plotted along the abscissa, and the values of the multiplication coefficients 807 are plotted along the ordinate.

As is apparent from FIG. 10, the multiplication coefficient at a magnification of 100% is defined as 1. The multiplication coefficient is decreased in accordance with an increase in white and black stripes upon a decrease in magnification. The multiplication coefficient at a magnification of 50% is 0.5. The multiplication coefficient is not decreased at a magnification of 50% or less in order to prevent omissions of information.

When an image is enlarged at a magnification of 100% or more, areal overemphasis of the density variations of the output at a magnification of 200% or more typically occurs. Therefore, the multiplication coefficient is gradually decreased. When the magnification reaches 600%, even the density variations included in the digital image signal 212 become conspicuous. In this case, the multiplication coefficient is set to be zero to eliminate edge emphasis in the main scanning direction.

In order to prevent typical occurrence of pixel density variables which is caused by variable magnification processing in this embodiment, the main scanning edge emphasis amount is controlled by the coefficient ROM 803 in accordance with the main scanning magnifications, thereby controlling the variation amounts.

However, at a magnification of 600% or more, the density variations included in the digital image signal 212 greatly degrade quality of the output image even if the above-mentioned edge emphasis is not performed.

Positive elimination of the density variations included in the digital image signal 212 is required at a magnification of 600% or more.

In this embodiment, two smoothing filters having different smoothing degrees are prepared and selectively used in accordance with main scanning magnifications.

A filter having a weak smoothing effect is used in the magnification range of 600% to 800%, and a filter having a strong smoothing effect is used in the magnification range of 800% or more.

No filtering is performed at a magnification of 600% or less.

The above filtering processing is performed by a filter circuit 809. The filter having a weak smoothing effect comprises an A filter for doubling the pixel of interest and multiplying by 1 pixels adjacent to the pixel of interest in the main scanning direction to smooth the density variations. The filter having a strong smoothing effect comprises a B filter for performing smoothing of four pixels, i.e., the pixel of interest, two preceding pixels, and one succeeding pixel.

Figure 12:
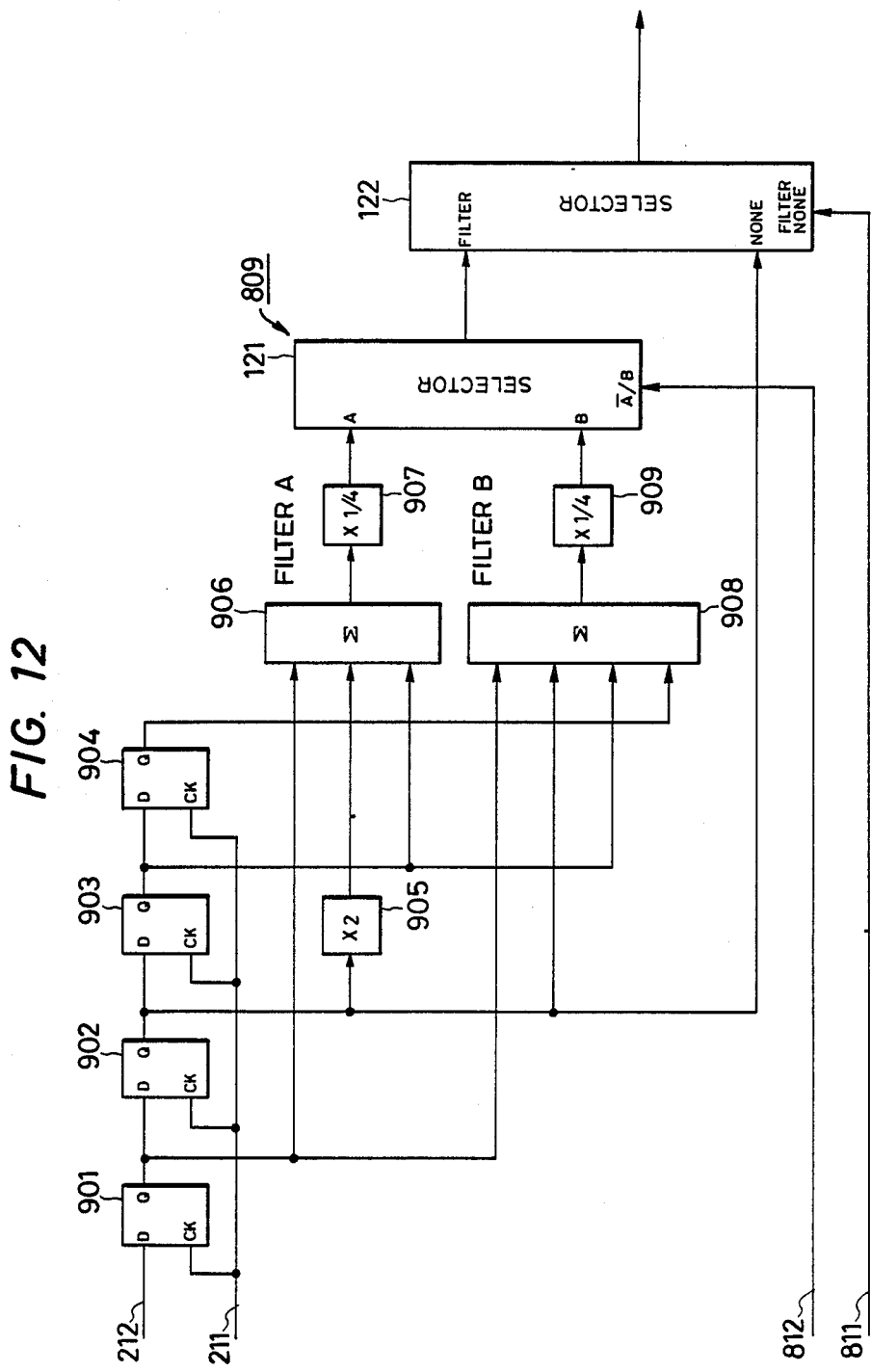
FIG. 12 is a diagram showing an arrangement of a filter.

The filter circuit 809 is arranged, as shown in FIG. 12. Referring to FIG. 12, the filter circuit 809 comprises flip-flops 901 to 904 for latching the input digital image signal 212 in units of pixels in response to pixel clocks 211. A multiplier 905 doubles the signal of the pixel of interest. The doubled signal of the pixel of interest from the multiplier 905 and the pixel signals adjacent to the signal of the pixel of interest are input to an adder 906. A sum signal from the adder 906 is multiplied by ¼ by a multiplier 907, and the product is input to a selector 121.

The output from the multiplier 907 serves as an output from the A filter.

The signal of the pixel of interest, its two preceding pixel signals, and its one succeeding pixel signal are input to an adder 908, and a sum signal from the adder 908 is multiplied by ¼ by a multiplier 909. The product from the multiplier 909 is input to the selector 121.

The output from the multiplier 909 serves as an output from the B filter.

Selection of the A and B filters is determined by the selector 121 in response to a signal 812. Whether or not filtering is performed is determined by a selector 122 in response to a signal 811.

Use/non-use of the filter and selection of the A/B filter are set by a filter control circuit 810 in accordance with main scanning magnifications.

The filter control circuit 810 for setting the filtering conditions receives the main scanning magnification signal from a main scanning magnification setting switch 805. If the main scanning magnification signal is less than 600%, the signal 811 is set at low level. Otherwise, the signal 811 is set at high level. When the magnification is 600% or more and less than 800%, the signal 812 is set at low level so as to use the A filter. However, when the magnification is 800% or more, the signal 812 is set at high level so as to use the B filter.

At the magnification which causes areal overemphasis of the main scanning pixel density variations, the filter having a strong smoothing effect is used to obtain a uniform output image having small density variations even at a larger magnification.

Figure 11:
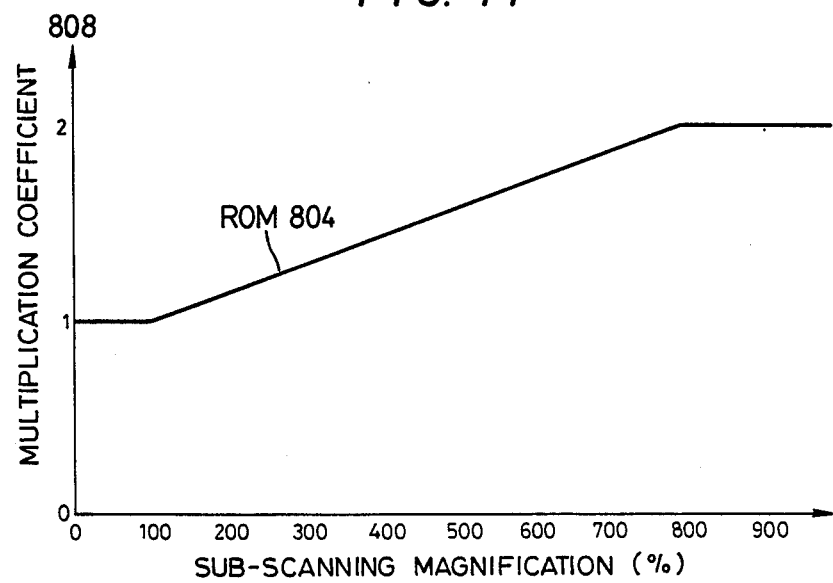
FIG. 11 is a graph showing the multiplication coefficient as a function of sub-scanning magnification.

The ROM 804 for outputting the sub-scanning edge emphasis signal multiplication coefficient is arranged to function in response to an increase blurring included in each pixel and caused by an increase in sub-scanning magnification, as shown in FIG. 11.

The multiplication coefficient at a magnification of 100% is given as 1 and is connected to coefficient "2" at a magnification of 800% through a straight line, thereby determining the coefficients in the magnification ranges of 100% to 800%. Note that the magnification coefficient is not increased at a magnification of 800% or more in order to prevent overemphasis of the edge of the output image by excessive edge emphasis. Note that the multiplication coefficient is not decreased at a magnification of 100% or less in order to eliminate predetermined blurring caused by an optical system such as a lens even if blurring included in the pixel is eliminated by an increase in sub-scanning rate.

The main scanning quadratic differential signal 312 and the sub-scanning quadratic differential signal 317 which are independently increased/decreased by the multipliers 801 and 802 in accordance with main scanning and sub-scanning magnifications are added to the signal 307 of the pixel of interest by an adder 318, thereby obtaining an edge-emphasized image signal 219.

The image signal 219 is input to the double buffer memory 214, and main scanning variable multiplication processing is performed at a given magnification.

Since edge emphasis processing is performed in consideration of the magnification, density variations and formation of white and black stripes both which are caused by variable multiplication processing can be prevented.

In the above embodiment, the quadratic differential signals are increased or decreased by multipliers in accordance with the variable multiplication. However, the number of delay lines of the line buffer memory 302 may be increased. For example, in addition to the lines adjacent to the line of interest, a line which is two lines ahead of the line of interest and a line which is two lines behind the line of interest may also be used to change the physical size of the Laplacian filter in accordance with the magnification.

As described above, the intensities of the edge in the main scanning and sub-scanning directions can be set independently, and optimal processing is performed for blurring factors inherent to main scanning and sub-scanning can be performed. As a result, an optimal output can be obtained.

Even if one of the main scanning and sub-scanning correction values must be suppressed in association with other image processing such as variable multiplication processing, the other correction value is not adversely affected, and control can be simplified.

Image degradation (e.g., variable magnification stripes in the main scanning direction, and density variations in the main scanning direction) caused by varying the edge emphasis parameter and image degradation (e.g., blurring in the sub-scanning direction) caused by a variable magnification can be suppressed to obtain a uniform output image which is free from the influence of the magnification.

In main scanning filtering at about a magnification (e.g., 600%) which does not require edge emphasis, filtering and edge emphasis are simultaneously used to obtain a smooth output image.

Filters to be used are not limited to two types having weak and strong smoothing effects, but can be extended to several types of filters having different smoothing magnitudes for a better effect.

If main scanning pixel variations are regular ones such as variations in even- or odd-numbered pixels, improvement of sharpness of the image by edge emphasis can be effectively achieved when variation elimination filters are used from a small magnification. If pixel variations are given as shown in FIG. 3A, variations can be completely eliminated when the A filter (1,2,1) in the filter circuit 809 is usually used.

The filter having a strong smoothing effect is not limited to a filter for smoothing the main scanning pixel variations, but can be extended to a two-dimensional filter for smoothing pixel variations in both the main scanning and sub-scanning directions.

According to the embodiment described above, by changing the magnitude of edge emphasis according to the magnifications, density variations and formation of black and white stripes, which are caused by variable magnification processing, can be prevented.

By selectively using edge emphasis processing and filtering processing in accordance with magnifications, image blurring which is a decisive drawback at a low magnification and image variations which are a decisive drawback at a high magnification can be eliminated in an optimal form. Therefore, a uniform output image free from the influences of magnifications can be obtained.

The present invention has been exemplified with reference to a preferred embodiment. However, the present invention is not limited to the particular embodiment described above. Various changes and modifications may be made within the scope of the appended claims.

What is claimed is:

1. An image signal processing apparatus comprising:
   reading means for photoelectrically reading an original image and outputting an image signal;
   means for setting a reproduction magnification of the original image;
   means for forming a correction signal, for use in an edge emphasis processing of an image signal of a particular pixel of the original image from image signals of a plurality of pixels of the original image near the particular pixel;
   processing means for performing the edge emphasis processing of the image signal of the particular pixel in accordance with the correction signal formed by said forming means; and
   control means for varying the level of the correction signal formed by said forming means in accordance with the reproduction magnification set by said setting means.

2. An apparatus according to claim 1, further comprising converting means for performing variable magnification processing of the edge-emphasized image signal from said processing means on the basis of the reproduction magnification set by said setting means.

3. An apparatus according to claim 2, further comprising means for recording an image based on the image signal subjected to the variable magnification processing performed by said converting means.

4. An apparatus according to claim 1, wherein said reading means reads the original image by scanning the original image in a main scanning direction and in a sub-scanning direction perpendicular to said main scanning direction, and said processing means performs different edge emphasis processings in the main scanning and sub-scanning directions.

5. An apparatus according to claim 1, wherein said control means has means for outputting a coefficient for varying the level of the correction signal in accordance with the reproduction magnification.

6. An apparatus according to claim 1, wherein said control means has multiplier means for increasing or decreasing the level of the correction signal formed by said forming means in accordance with the reproduction magnification.

7. An apparatus according to claim 1, wherein said reading means has a line sensor comprising a plurality of light receiving elements arranged in a line configuration.

8. An image signal processing apparatus comprising:
reading means for photoelectrically reading an original image in a main scanning direction and in a sub-scanning direction perpendicular to said main scanning direction and outputting an image signal;
means for setting reproduction magnification of the original image in the main scanning direction and the sub-scanning direction, respectively;
means for forming correction signals for use in an edge emphasis processing related to the main scanning and the sub-scanning directions, respectively, from the image signals of a plurality of pixels of the original image near a particular pixel of the original image;
processing means for performing the edge emphasis processing on an image signal of the particular pixel in accordance with the correction signals formed by said forming means; and
control means for varying the levels of the correction signals formed by said forming means in accordance with the main scanning and sub-scanning reproduction magnifications set by said setting means in the main scanning and sub-scanning directions.

9. An apparatus according to claim 8, further comprising converting means for performing main scanning variable magnification processing of the edge-emphasized image signal from said processing means on the basis of the main scanning reproduction magnification set by said setting means.

10. An apparatus according to claim 9, further comprising means for recording an image based on the image signal subjected to the variable magnification processing performed by said converting means.

11. An apparatus according to claim 8, wherein said reading means changes a rate at which it reads the original image in the sub-scanning direction in accordance with the sub-scanning reproduction magnification set by said setting means.

12. An apparatus according to claim 8, wherein said control means has means for outputting respective coefficients as to the main scanning and sub-scanning directions for varying the levels of the correction signals in accordance with the reproduction magnifications.

13. An apparatus according to claim 8, wherein said control means has multiplier means for increasing or decreasing the levels of the correction signals formed by said forming means in accordance with the reproduction magnifications.

14. An apparatus according to claim 8, wherein said reading means has a line sensor comprising a plurality of light-receiving elements arranged in a line configuration.

15. An image signal processing apparatus comprising:
reading means for photoelectrically reading an original image and outputting an image signal;
setting means for setting a reproduction magnification of the original image;
processing means for performing smoothing processing of the image signal from said reading means; and
control means for controlling the smoothing processing of said processing means in accordance with the reproduction magnification set by said setting means.

16. An apparatus according to claim 15, further comprising converting means for performing variable magnification processing of the smoothed image signal from said processing means on the basis of the reproduction magnification set by said setting means.

17. An apparatus according to claim 16, further comprising means for recording an image based on the image signal subjected to the variable magnification processing performed by said converting means.

18. An apparatus according to claim 15, wherein said processing means can perform a plurality of different smoothing operations.

19. An apparatus according to claim 15, wherein said control means determines whether the smoothing processing performed by said processing means is to be carried out or not in accordance with reproduction magnification.

20. An apparatus according to claim 15, wherein said reading means has a line sensor comprising a plurality of light-receiving elements arranged in a line configuration.

21. An image signal processing apparatus comprising:
reading means for photoelectrically reading an original image and outputting an image signal;
setting means for setting a reproduction magnification of the original image;
first processing means for performing smoothing processing of the image signal from said reading means;
second processing means for performing edge emphasis processing of the image signal from said reading means; and
control means for controlling the smoothing processing by said first processing means and the edge emphasis processing by said second processing means in accordance with the reproduction magnification set by said setting means.

22. An apparatus according to claim 21, wherein said second processing means performs edge emphasis processing of the image signal smoothed by said first processing means.

23. An apparatus according to claim 21, further comprising third processing means for performing variable magnification processing of the image signal subjected to smoothing processing and edge emphasis processing by said first and second processing means in accordance with the reproduction magnification set by said setting means.

24. An apparatus according to claim 23, further comprising means for recording an image based on the image signal subjected to the variable magnification processing performed by said third processing means.

25. An apparatus according to claim 21, wherein said control means changes the smoothing processing performed by said first processing means in accordance with the reproduction magnification.

26. An apparatus according to claim 21, wherein said control means varies a degree of edge emphasis processing performed by said second processing means in accordance with the reproduction magnification.

27. An apparatus according to claim 21, wherein said reading means has a line sensor comprising a plurality of light receiving elements arranged in a line configuration.

28. An image signal processing apparatus comprising:
reading means for photoelectrically reading an original image and outputting an image signal;
means for setting a reproduction magnification of the original image;
means for forming a processing signal, for use in processing an image signal of a particular pixel, of the original image, from image signals of a plurality of pixels of the original image near the particular pixel;
processing means for processing the image signal of the particular pixel in accordance with the processing signal formed by said forming means; and
control means for varying the level of the processing signal formed by said forming means in accordance with the reproduction magnification set by said setting means.

29. An apparatus according to claim 28, further comprising converting means for performing variable magnification processing of the image signal from said processing means on the basis of the reproduction magnification set by said setting means.

30. An apparatus according to claim 29, further comprising means for recording an image based on the image signal subjected to the variable magnification processing performed by said converting means.

31. An apparatus according to claim 28, wherein said processing means performs edge emphasis processing on the image signal of the particular pixel in accordance with the processing signal.

32. An apparatus according to claim 28, wherein said control means has means for outputting a coefficient for varying the level of the processing signal in accordance with the reproduction magnification.

33. An apparatus according to claim 28, wherein said control means has multiplier means for increasing or decreasing the level of the processing signal in accordance with the reproduction magnification.

34. An apparatus according to claim 28, wherein said reading means has a line sensor comprising a plurality of light receiving elements arranged in a line configuration.

* * * * *

UNITED STATES PATENT AND TRADEMARK OFFICE
CERTIFICATE OF CORRECTION

PATENT NO. : 4,860,118
DATED : August 22, 1989
INVENTOR(S) : SHINOBU ARIMOTO

Page 1 of 2

It is certified that error appears in the above-identified patent and that said Letters Patent is hereby corrected as shown below:

On the title page:

IN [57] ABSTRACT

Line 8, "cotnrol" should read --control--.

COLUMN 1

Line 63, "with -1." should read --by -1.--.
Line 66, "adder 815" should read --adder 816--.

COLUMN 4

Line 41, "as" should read --at--.

COLUMN 6

Line 11, "second clock circuit 218," should read --second clock control circuit 218,--.
Line 13, "read-in clock 222)" should read --read-out clock 222)--.

COLUMN 7

Line 7, "multiplier 307" should read --multiplier 310--.
Line 12, "multiplied -1" should read --multiplied by -1--.

UNITED STATES PATENT AND TRADEMARK OFFICE
CERTIFICATE OF CORRECTION

PATENT NO. : 4,860,118
DATED : August 22, 1989
INVENTOR(S) : SHINOBU ARIMOTO

It is certified that error appears in the above-identified patent and that said Letters Patent is hereby corrected as shown below:

COLUMN 9

Line 26, "both which" should read --both of which--.

COLUMN 10

Line 38, "image from" should read --image, from--.

COLUMN 11

Line 15, "magnification" should read --magnifications--.
    Line 21, "the" (first occurrence) should be deleted.

COLUMN 13

Line 11, "pixel," should read --pixel--.

Signed and Sealed this

Thirty-first Day of July, 1990

Attest:

HARRY F. MANBECK, JR.

*Attesting Officer*      *Commissioner of Patents and Trademarks*